United States Patent
Adderton et al.

(12) 
(10) Patent No.: US 6,951,143 B1
(45) Date of Patent: Oct. 4, 2005

(54) THREE-AXIS SENSOR ASSEMBLY FOR USE IN AN ELASTOMERIC MATERIAL

(75) Inventors: Dennis M. Adderton, Santa Barbara, CA (US); Stephen C. Minne, Danville, IL (US)

(73) Assignee: Michelin Recherche et Technique S.A., Granges-Paccot (CH)

(*) Notice: Subject to any disclaimer, the term of this patent is extended or adjusted under 35 U.S.C. 154(b) by 25 days.

(21) Appl. No.: 09/724,655

(22) Filed: Nov. 28, 2000

(51) Int. Cl.⁷ .............................................. G01L 1/22
(52) U.S. Cl. .............................................. 73/862.044
(58) Field of Search ................ 73/862.044, 862.041, 73/862.043, 862.045, 862.338, 862.424, 862.627, 862.41–862.45

(56) References Cited

U.S. PATENT DOCUMENTS

| | | | |
|---|---|---|---|
| 3,822,590 A | * | 7/1974 | Tharpe et al. ............... 73/160 |
| 4,231,410 A | | 11/1980 | Vannan, Jr. |
| 4,982,611 A | | 1/1991 | Lorenz et al. |
| 5,181,975 A | | 1/1993 | Pollack et al. |
| 5,218,861 A | | 6/1993 | Brown et al. |
| 5,247,831 A | | 9/1993 | Fioravanti |
| 5,341,687 A | | 8/1994 | Stan |
| 5,483,827 A | | 1/1996 | Kulka et al. |
| 5,500,065 A | | 3/1996 | Koch et al. |
| 5,749,984 A | | 5/1998 | Frey et al. |
| 5,960,844 A | | 10/1999 | Hamaya |
| 5,964,265 A | | 10/1999 | Becherer |
| 5,977,870 A | | 11/1999 | Rensel et al. |
| 6,030,478 A | | 2/2000 | Koch et al. |
| 6,147,659 A | | 11/2000 | Takahashi et al. |
| RE37,065 E | * | 2/2001 | Grahn ............... 73/862.043 X |
| 6,637,276 B2 | * | 10/2003 | Adderton et al. ........ 73/862.41 |

FOREIGN PATENT DOCUMENTS

| | | | | |
|---|---|---|---|---|
| WO | WO 9501556 A1 | * | 6/1994 | ............. 73/822.41 |

* cited by examiner

*Primary Examiner*—Max Noori
(74) *Attorney, Agent, or Firm*—Dority & Manning, P.A.

(57) ABSTRACT

According to a first aspect of the preferred embodiment, a three-axis sensor assembly for use in an elastomeric material includes a first pair of sensors disposed along a first pair of respective axes that intersect, the first sensors being adapted to detect a force in a first direction. In addition, the sensor assembly includes a second pair of sensors disposed along a second pair of respective axes that intersect, the second sensors detecting a force in a second direction generally orthogonal to the first direction. Furthermore, in the assembly, the force measured in the first direction is equal to the difference between the outputs of the first sensors, and the force measured in the second direction is equal to the difference between the outputs of said second sensors. According to another aspect of the preferred embodiment, the sum of the outputs of the first sensors and the second sensors equals a force in a third direction orthogonal to the first and second directions. In another aspect of the preferred embodiment, the first pair of sensors are disposed on first opposed faces of a pyramid-shaped body, and the second pair of sensors are disposed on second opposed faces of the pyramid-shaped body. In addition, the elastomeric material can be a vehicle tire, and the tire may include a plurality of the sensor assemblies disposed about its perimeter in mutually spaced relationship.

50 Claims, 12 Drawing Sheets

← X →

THREE-AXIS SENSOR ASSEMBLY FOR USE IN AN ELASTOMERIC MATERIAL

BACKGROUND OF THE INVENTION

1. Field of the Invention

The present invention relates to strain sensors and, more particularly, strain sensors embedded in an elastomeric material for measuring forces along three axes.

2. Description of the Related Art

Conventional strain gauges or sensors are typically used for measuring the expansion and/or contraction of an object under stress. Strain sensors may comprise a resistive transducer, the electric output of which is proportional to the amount it is deformed under strain. In one type of resistive strain gauge illustrated in FIG. 1, the gauge 1 is made of a metal foil or metal wire 2 that is mounted on a substrate 3, wherein the wire changes resistance with expansion or contraction in a particular direction. FIG. 1 illustrates movement of the gauge, which is indicative of movement of the object being monitored, with the arrow "x" indicating movement in the "x" direction. Such a sensor requires either a DC or an AC excitation voltage to generate a strain signal. In addition, it is preferably connected in a differential arrangement such as in a Wheatstone bridge circuit to determine the amount of strain. Other types of strain sensors include parallel plate capacitors, piezoresistive silicon strain gauges, piezoelectric devices such as lead zirconium titanate (PZT), capacitors formed of inter-digitized fingers simulating adjacent parallel-plate capacitors, conductive elastomer resistive strain gauges, etc.

Each of these strain sensors is adapted to measure strain forces exerted on an object in a particular direction. However, measuring strain in three axes is often desirable. For example, multiple axis strain detection is often of particular concern in determining shear and compressive strain in an elastomeric tire. Monitoring the forces exerted on the tread rubber of a tire in multiple axes can provide an indication as to the performance of the tire (e.g., traction), as well as provide information valuable, for example, in controlling different components of a vehicle. According to one type of tire monitoring sensor, the deflection of tire tread is measured as it passes through a contact patch, the contact patch being defined by that portion of the tire in contact with the road at any particular time. The sensor in this device is a piezoelectric polymer, a photo restrictive fiber optic, a variable plate capacitor, or a variable inductor, each of which is capable of measuring the length of the contact patch during tire operation. In addition, the sensor is connected to a transponder device for communicating single-axis strain data for analysis. Most notably, the data obtained by such a sensor does not provide any useful traction information because it is only capable of measuring the length of the contact patch. As a result, variables which affect the coefficient of friction, such as road condition, are ignored. Overall, this sensor is unable to provide sufficient data for determining tri-axial strain forces of interest.

According to another known type of tire sensing device, a number of toroidal bands of piezoresistive or piezoelectric material are disposed in the tread of the tire. Notably, the measurement obtained by this device is not localized to a single tread block, and as a result, suffers from undesirable effects due to centrifugal force, road surface irregularities, and pressure changes. In yet another sensor device for monitoring tires, reed sensors incorporating strain gauges are employed, each sensor measuring forces directed in a single axis. In this arrangement, three separate devices, disposed at three separate locations, are required to obtain three axes of traction data. A significant problem associated with such a device is that each individual tread block will experience forces from the three axes concurrently. Typically, each tread block acts independently in a stick-slip fashion. As a result, measuring X axis data from one tread block, Y axis data from an adjacent tread block and Z axis data from yet another location, will yield three axes of data that is of little use.

In view of the above, the field of sensor devices was in need of a sensor assembly that measures strain in three dimensions at a particular point or region so as to monitor, for example, tire traction, etc. Moreover, such a device should be self-contained contained and be capable of being embedded in an object to be monitored, such as an elastomeric material (e.g., the rubber of a tire), during manufacture of the object without compromising the integrity of its performance.

OBJECTS AND SUMMARY OF THE INVENTION

The present invention is directed to a sensor assembly for measuring strain forces in three dimensions. The preferred embodiment is particularly adapted to being embedded in an elastomeric material, such as a tire, during the manufacture of the tire. The sensor assembly is a self-contained device, and as such is particularly adapted to making three axis measurements at a particular point or region of the object being monitored.

According to a first aspect of the preferred embodiment, a three-axis sensor assembly for use in an elastomeric material includes a first pair of sensors disposed along a first pair of respective axes that intersect, the first sensors being adapted to detect a force in a first direction. In addition, the sensor assembly includes a second pair of sensors disposed along a second pair of respective axes that intersect, the second sensors detecting a force in a second direction generally orthogonal to the first direction. Furthermore, in the assembly, the force measured in the first direction is equal to the difference between the outputs of the first sensors, and the force measured in the second direction is equal to the difference between the outputs of said second sensors. According to another aspect of the preferred embodiment, the sum of the outputs of the first sensors and the second sensors equals a force in a third direction orthogonal to the first and second directions.

According to a further aspect of the invention, a three-axis sensor assembly embedded in an elastomeric material includes a first sensing element generating a first output indicative of strain in a first direction, and a second sensing element generating a second output indicative of strain in a second direction orthogonal to the first direction. Moreover, the sum of the first and second outputs is indicative of strain in a third direction orthogonal to both the first direction and the second direction.

According to a still further aspect of the invention, a sensor assembly embedded in an elastomeric material includes a pair of first strain sensors disposed on first opposed faces of a flexible pyramid-shaped body, the first strain sensors detecting a force in a first direction. In addition, the first strain sensors generate corresponding output signals in response to the force in the first direction, and wherein the force in the first direction is generally equal to the difference between the output signals of the first strain sensors. In one embodiment, the elastomeric material comprises a vehicle tire. In yet another embodiment, a plurality of the sensing assemblies are disposed in mutually spaced relationship around the perimeter of the tire.

According to another aspect of the invention, the assembly includes a pair of second strain sensors disposed on second opposed faces of the body, the second opposed faces being disposed adjacent to the first opposed faces, and the second strain sensors detecting a force in a second direction generally orthogonal to the first direction. Further, the second strain sensors generate corresponding output signals in response to the force in the second direction, and wherein the force in the second direction is generally equal to the difference between the output signals of the second strain sensors.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 2:
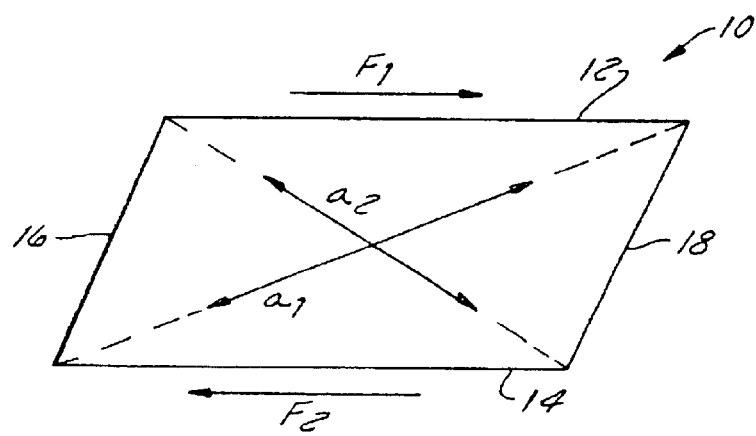
FIG. 2 is a schematic illustration of an elastomeric element under sheer strain.

Referring to FIG. 2, the effects of shear strain on a parallelogram-shaped elastomeric element 10 are shown. Element 10 has two diagonal axes $a_1$ and $a_2$ that intersect. When shear stain is applied, forces $F_1$ and $F_2$ act on opposed top and bottom surfaces 12, 14, respectively, of element 10. In response, elastomeric element 10 flexes and first diagonal axis $a_1$ elongates and second diagonal axis $a_2$ compresses. Note that that strain forces $F_1$ and $F_2$ are equal and opposite.

The force ($F_1=F_2$) is equal to the strain measured along $a_1$ minus the strain measured along $a_2$. In this first order approximation of the response, $a_1$ is an axis of elongation and $a_2$ is an axis of contraction. Notably, element 10 can be characterized by a range of aspect ratios, thus defining any possible angle between $a_1$ and $a_2$ depending upon desired sensor sensitivity, etc.

Figure 3:
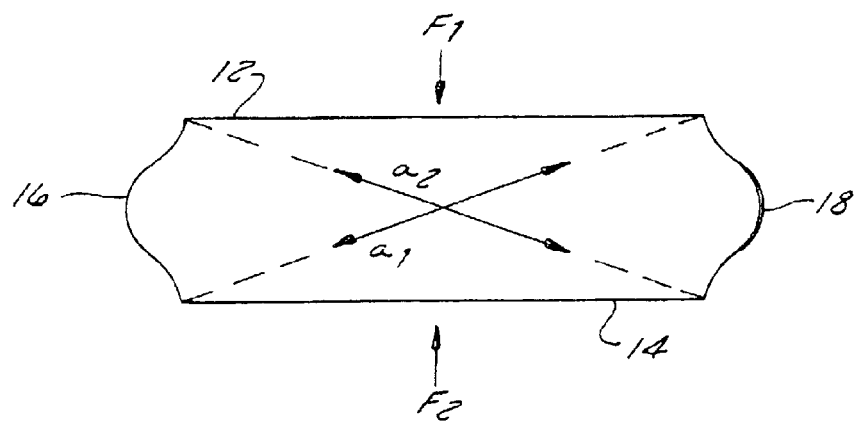
FIG. 3 is a schematic illustration, similar to FIG. 2, showing an elastomeric element under compressive strain.

In FIG. 3, compressive forces acting on element 10 are similarly shown in a first order approximation. Again $F_1$ and $F_2$ act on opposed surfaces 12, 14 of element 10 and are generally equal. However, in this case, $F_1$ and $F_2$ are compressive and each diagonal axis $a_1$ and $a_2$ is contracted as each side surface 16, 18 of element 10 bulges outwardly. Again, the compressive force is equal to a sum of the strain measured along axes $a_1$ and $a_2$. In the preferred embodiment of the present invention, an arrangement of strain sensors is employed to measure these shear and compressive forces in three dimensions.

With further reference to FIGS. 2 and 3, in the case of a tread block of a tire tread, $F_1$ would be applied by the road surface, and $F_2$ would be applied by the tire carcass. This shear strain is analogous to a lateral or linear acceleration of the vehicle acting on the tread rubber at the road surface. Similarly, the compressive strain shown in FIG. 3 is typically always present in the contact region of the tire and will vary as the weight of the car shifts in response to turning, accelerating and braking, for example.

Figure 4:
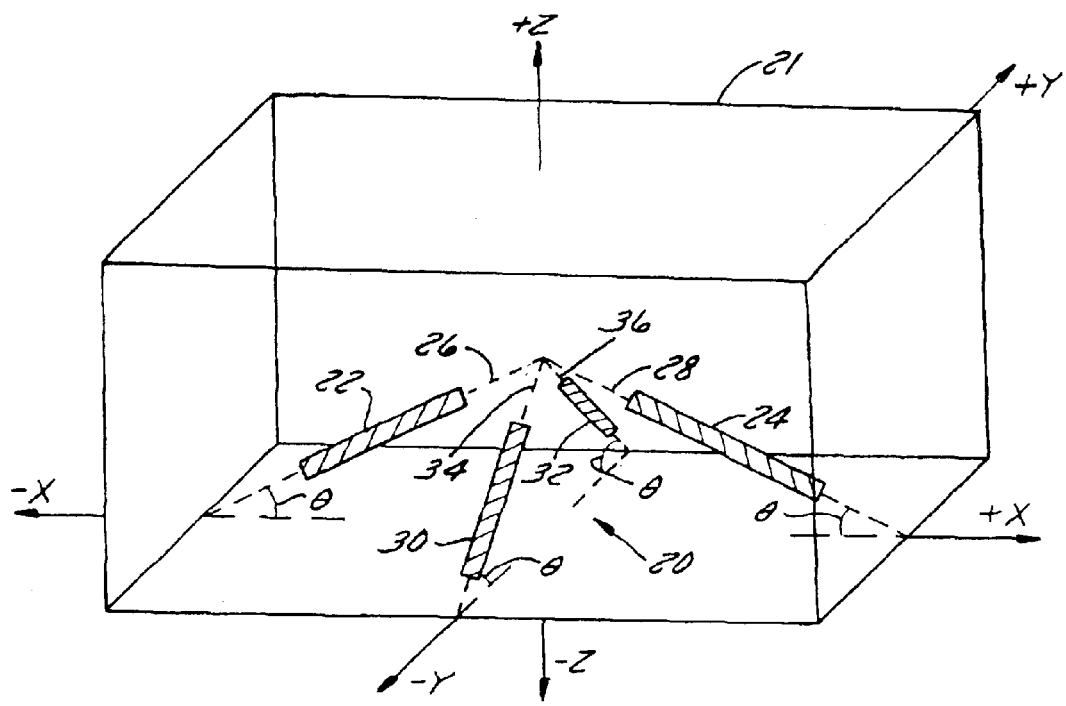
FIG. 4 is a perspective view of a sensor assembly according to a preferred embodiment of the present invention, the assembly being embedded in an elastomeric body.

Turning to FIG. 4, a sensor assembly 20 including an arrangement of strain sensors for measuring strain forces exerted on an elastomeric body 21 is shown. Assembly 20 measures strain forces in a first direction (e.g., the direction of the forces $F_1$ and $F_2$ in FIGS. 2 and 3), as well as strain forces in two directions each orthogonal to the first direction. Note that directions "X", "Y" and "Z" are used herein in conventional fashion, merely as a matter of convenience to illustrate three orthogonal directions.

More particularly, a first pair of strain sensors 22, 24 are disposed along corresponding axes 26, 28 that lie in the X-Z plane, as defined in FIG. 4. Sensors 22, 24 measure tensile strain along their respective axes to collectively determine the amount of shear force in a first direction (e.g., the X direction as shown in FIG. 3). Axes 26, 28 generally correspond to axes $a_1$ and $a_2$ (FIGS. 2 and 3), and thus the force measured by sensors 22, 24 is equal to a differential measurement of the outputs of sensor 22 and sensor 24, as described previously. This force is equal to the amount of shear force in the X direction. Notably, axes 26, 28, along which corresponding sensors 22, 24 are placed, intersect the axis which defines the direction the strain is to be measured (the x axis in FIG. 3) at an angle $\theta$. Angle $\theta$ can be selected according to a number of variables including desired sensitivity of the sensor. In a preferred embodiment, $\theta$ is forty-five degrees.

Similar to sensors 22, 24, a second pair of sensors 30, 32 for measuring, among other things, forces in a second direction are disposed along corresponding axes 34,36 which reside in a plane orthogonal to the X-Z plane, the Y-Z plane. Axes 34,36 intersect the axis of interest (the Y axis) at an angle $\theta$, preferably the same angle at which axes 26,28 lie relative to the X-axis. Again, the force measured by sensors 30,32 is equal to the shear strain measured by sensor 30 minus the shear strain measured by sensor 32. This force is the amount of shear strain along the Y-axis.

Using sensor assembly 20 to obtain a measure of both the shear force in the X direction and the shear force in the Y direction, as described above, a compressive force along the Z-axis can be determined. In particular, the compressive force in the Z direction is equal to the sum of the tensile strains measured by sensors 22, 24, 30, and 32. In this way, a separate sensor arrangement for measuring compressive force is not required.

Figure 5:
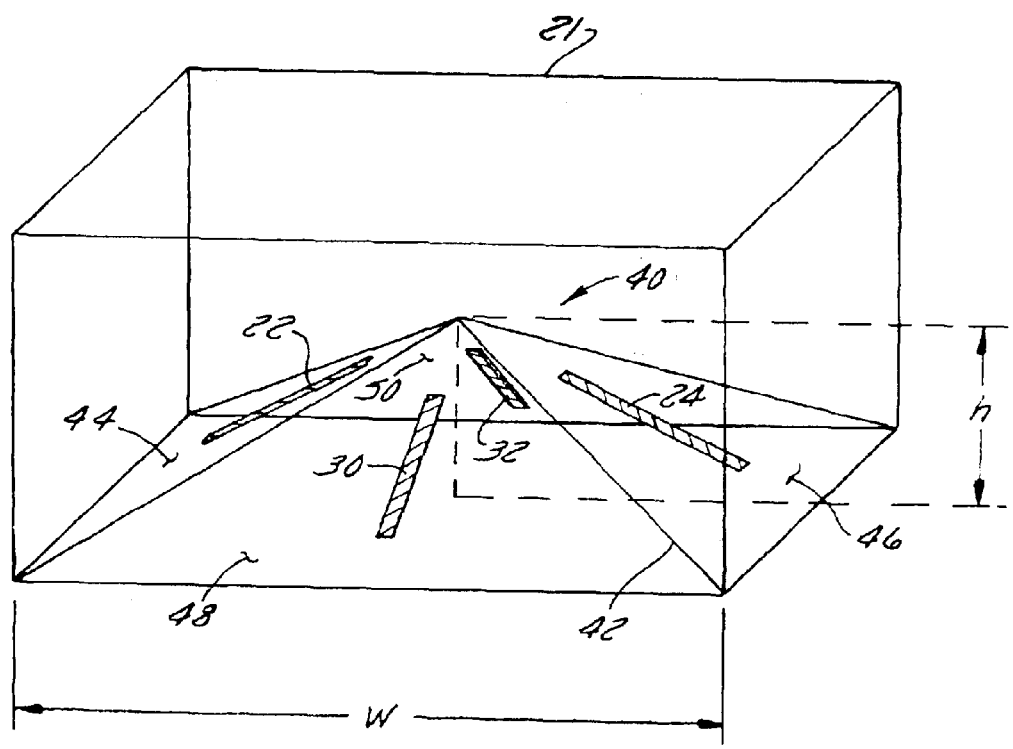
FIG. 5 is perspective view of a sensor assembly according to a preferred embodiment of the present invention, illustrating strain sensors mounted on a pyramid-shaped body embedded in the elastomeric material.

Turning next to FIG. 5, rather than embedding sensors 22, 24, 30, 32 directly in elastomeric body 21 as shown in FIG. 4, a sensor assembly 40 employs a flexible pyramid-shaped body or insert 42 having four faces 44 46, 48, 50 to which sensors 22, 24 30, 32 are coupled, respectively. Pyramid 42 is preferably embedded in elastomeric body 21 (described in further detail below) to measure strain forces exerted thereon.

Pyramid 42 may be made of the same material as the surrounding elastomer of body 21, or may be made of some other appropriate material. Further pyramid 42 may be truncated, having a flat top. The incline of faces 44, 46, 48, 50 (corresponding generally to angle $\theta$ depicted in FIG. 4) is chosen to achieve a desired sensitivity of the strain sensors to the applied shear and compressive strains. Moreover, the orientation of pyramid 42 with respect to the applied strain forces may be inverted, thereby inverting the response of the strain sensors 22, 24, 30, 32 to the applied strains.

Figure 1:
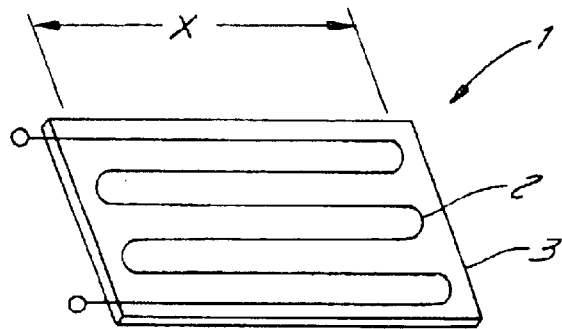
FIG. 1 is a schematic illustration of a prior art resistive strain gauge.
Figure 1E:
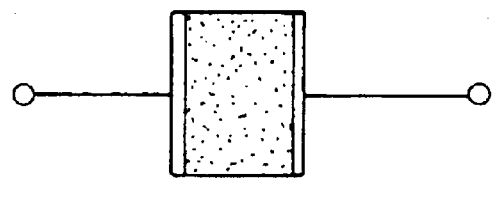
FIGS. 1A–1E are schematic illustrations of exemplary strain gauges for use in a preferred embodiment of the present invention.
Figure 1D:
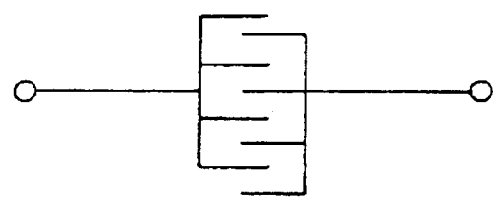
Figure 1C:
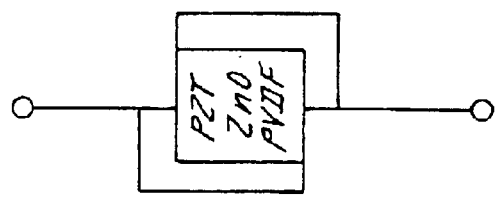

Strain sensors 22, 24, 30, 32 of the sensor assembly (20 in FIG. 3, 40 in FIG. 4) may be any sensor that changes one or more measurable properties as a result of strain along at least one axis. For example, a first preferred type of strain sensor was shown in FIG. 1, illustrating a metal foil or a metal wire resistive strain gauge. This sensor requires either a DC or an AC excitation voltage to generate a strain signal. Moreover, it is preferably connected in a differential arrangement such as in a Wheatstone bridge circuit (for example, see FIGS. 6A and 6B). Another type of useful strain sensor is a parallel plate capacitor shown in FIG. 1A. A parallel plate capacitor may be used to obtain an AC measurement of capacitance. Alternatively, a bias voltage may be applied to the device such that a displacement current is generated when the distance between the plates of the capacitor changes.

Figure 1B:
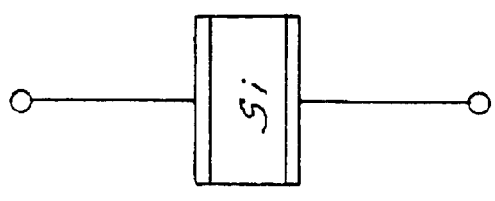
Figure 1A:

In another alternative, the strain sensors may comprise piezoresistive silicon strain gauges, as shown in FIG. 1B. This strain gauge is typically constructed of micromachined silicon, doped to an appropriate resistance value. Similar to the metal wire resistive strain gauge shown in FIG. 1, the piezoresistive strain gauge is preferably connected in a differential arrangement such as a Wheatstone bridge circuit. Next, the sensors may be piezoelectric devices such as PZT (lead zirconium titanate), ZnO (zinc oxide), or PVDF. (polyvinyl diethyl fluoride) devices, like the schematic example shown in FIG. 1C. Piezoelectric devices generate a charge signal in response to the applied strain. A high input impedance buffer is preferably employed with this sensor to preserve low frequency response.

As shown in FIG. 1D, sensors 22, 24, 30, 32 may each be a capacitor formed from two components comprising inter-digitated fingers. As applied strain pulls the two components of this sensor away or toward one another, the overlapping area of the fingers will vary, thereby varying the capacitance. Similar to the parallel plate capacitor sensor described previously, the interdigitated capacitor sensor may be used to obtain an AC measurement of capacitance, or a bias voltage may be applied such that a displacement current is generated when the distance between the plates changes. In yet another alternative, a conductive elastomer resistive strain gauge, shown in FIG. 1E, may be employed in the sensor assembly (40 in FIG. 5, for example). An elastomeric medium, such as rubber is doped with conductive particles, such as carbon black. Applied strain will distort the, device, changing the spacing between conductive particles, thereby changing the resistance. Similar to the resistor shown in FIG. 1, this sensor requires either a DC or an AC excitation voltage to generate a strain signal. Moreover, the sensor is preferably connected in a differential arrangement such as a Wheatstone bridge circuit. Notably, the above sensors are merely examples of some types of sensors useful in the sensor assemblies of the preferred embodiment, other types of sensing elements could be used as sensors 22, 24, 30, 32, as well as any combination of the above.

Figure 6A:
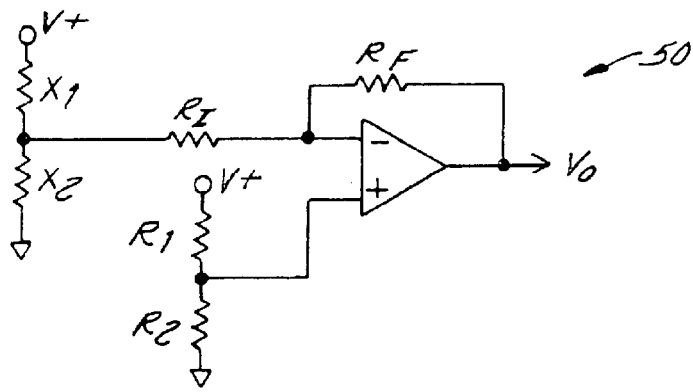
FIGS. 6A and 6B are schematic circuit diagrams for differentially measuring strain detected by resistive strain gauges, according to a preferred embodiment.
Figure 6B:
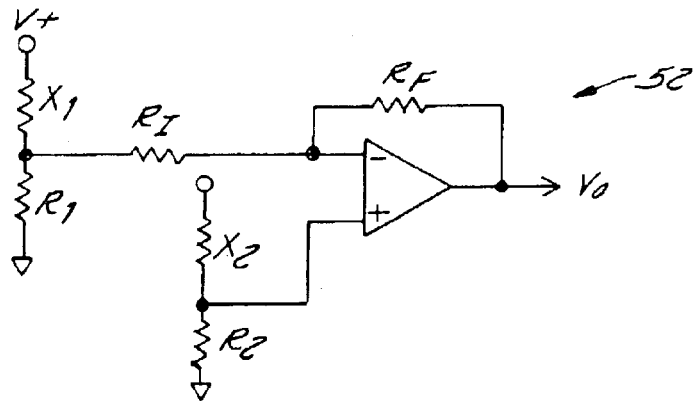

Next, turning to FIGS. 6A and 6B, the output of the resistive-type strain gauges is preferably measured differentially, as described above. FIGS. 6A and 6B show two differential Wheatstone bridge circuit arrangements 50, 52, respectively, capable of measuring strain forces in a single axis. In each case, resistors $x_1$ and $x_2$ (for example, 22 and 24 in FIG. 4 for making x-axis measurements) are strain sensors, preferably disposed as shown in the pyramid arrangement of the preferred embodiment shown in FIG. 5. Resistors $R_1$ and $R_2$ are reference resistors, insensitive to strain. $R_1$ and $R_2$ preferably have a thermal response that is matched to strain sensors $x_1$ and $X_2$. $R_1$ and $R_2$ are also preferably of the same resistance value as the nominal value of $x_1$ and $x_2$. $R_1$, $R_2$, $x_1$, $x_2$ are preferably between 120 $\Omega$ to 1 k$\Omega$, and more preferably are approximately 350 $\Omega$. $R_i$ is the input resistor for the inverting amplifier and $R_f$ is the feedback resistor, and define the gain of the amplifier. Preferably, resistors $R_i$ and $R_f$ are selected so as to yield an amplifier gain of about 100, as is conventional for standard foil-type strain gauges.

More particularly, the output $V_o$ of circuits 50, 52 is indicative of the amount of strain force (for example, shear force) detected by strain sensors $x_1$, $x_2$, wherein output $V_o$ of differential circuit 50 is generally equal to $$V_o = (V^+)\left(\frac{R_f}{R_i}\right)\left(\frac{R_2}{R_1+R_2} - \frac{x_2}{x_1+x_2}\right) \qquad \text{Eqn. 1}$$

wherein $V^+$ is the excitation voltage (typically, 3 volts), and $a_1$ and $a_2$ are resistance values associated with the strain sensors which, again, have a nominal value preferably equal to 350 Ω, and $R_F$ and $R_I$ are the feedback and input resistors, respectively. On the other hand, the output $V_o$ of differential circuit 52 is generally equal to, $$V_o = (V^+)\left(\frac{R_f}{R_i}\right)\left(\frac{R_2}{x_2+R_2} - \frac{R_1}{x_1+R_1}\right) \qquad \text{Eqn. 2}$$

wherein the variables are defined as in Equation 1.

Notably, circuit 50 in FIG. 6A references $a_1$ to $a_2$. One advantage of circuit 50 is that it can readily cancel unwanted signals since both of these resistors are preferably identical and are similarly disposed, for example on the pyramid (42 in FIG. 5). Further, as such, circuit 50 is easily balanced and is thermally stable. On the other hand, circuit 52 in FIG. 6B has advantages in that it is more readily adapted to incorporation in a circuit that is capable of providing three axes of differential measurement from, for example, the four sensors 22, 24, 30, 32 disposed on pyramid 42. A circuit 60 incorporating circuit 52 for making three-axis measurements is shown in FIG. 7.

Figure 7:
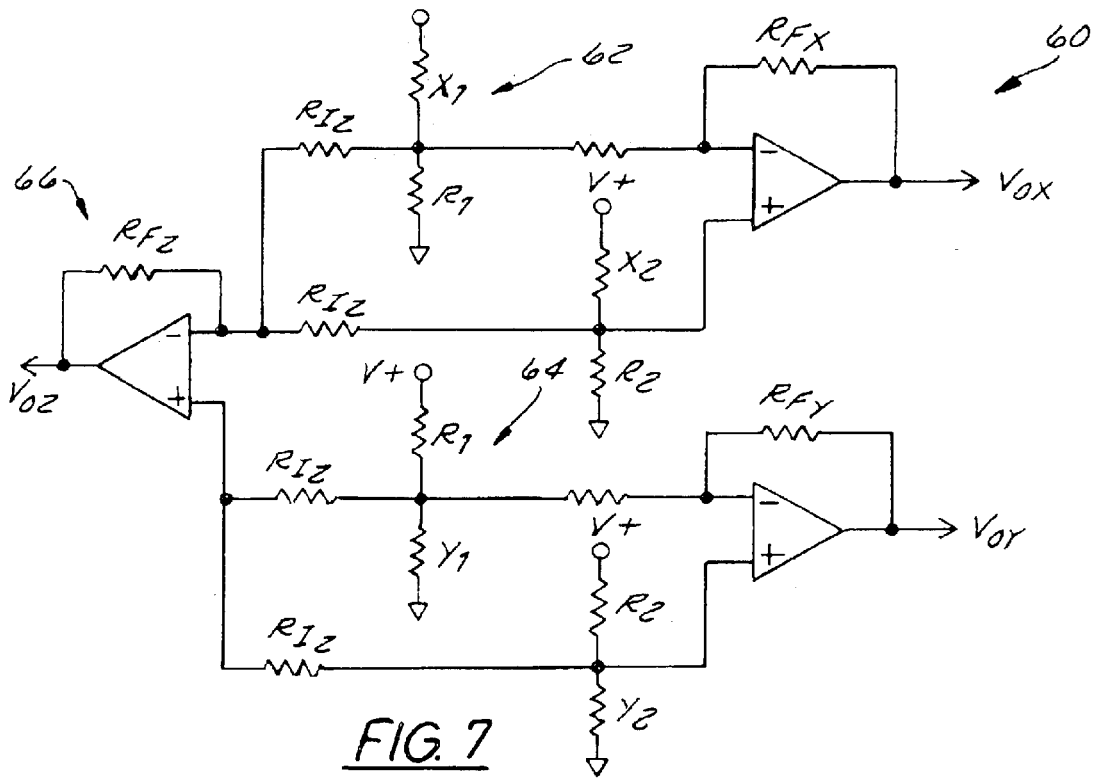
FIG. 7 is a schematic circuit diagram for differentially measuring strain in three axes using, in part, the circuit of FIG. 6B.

With reference to FIG. 7, for resistive-type strain gauges, circuit 60 is employed for making three axis strain measurements. Preferably, two circuits 62, 64 (similar to circuit 52 in FIG. 6B) having corresponding strain sensors $x_1$, $x_2$ and $y_1$, $y_2$, respectively, are electrically coupled to measure shear strain in the x and y axes, respectively. $V_{ox}$ and $V_{oy}$ are computed according to Equation 2 and are indicative of shear strain in the x and y axes, respectively. More particularly, the amount of shear strain in the x and y axes is generally equal to, respectively, $$\frac{V_o}{V^+} = \left(\frac{R_f}{R_i}\right)\left(\frac{R_2}{x_2+R_2} - \frac{R_1}{x_1+R_1}\right) \text{ and} \qquad \text{Eqn. 3}$$

$$\frac{V_o}{V^+} = \left(\frac{R_f}{R_i}\right)\left(\frac{y_2}{R_2+y_2} - \frac{y_1}{R_1+y_1}\right) \qquad \text{Eqn. 4}$$

wherein the variables are defined as described above, except $y_1$ and $y_2$ are a measure of y axis shear strain.

A third amplifier circuit 66 sums the response of all four sensors $x_1$, $x_2$, $y_1$, $y_2$ (corresponding to sensors 22, 24, 30, 32, for example) to give a signal corresponding to compressive strain in the z axis. Notably, x-axis stage or circuit 62 includes strain sensors $x_1$, $x_2$ on the positive side of the reference resistors $R_1$ and $R_2$, and y-axis stage or circuit 64 includes strain sensors $y_1$, $y_2$ on the negative or ground side of the reference resistors. As a result, the x and y strain signals generated by resistive strain sensors $x_1$, $x_2$, $y_1$, $y_2$ can be summed by using differential z circuit 66 since their polarities are inverted with respect to each other (i.e., the inverted polarity of the two causes z-axis circuit 66, which is a differential circuit, to add the outputs of the strain sensors). The amount of compressive or z-axis strain in this case is generally given by, $$\frac{V_o}{V^+} = -\left(\frac{R_f}{R_i}\right) \cdot \left(\frac{R_1}{x_1+R_1} + \frac{R_2}{x_2+R_2} + \frac{y_1}{R_1+y_1} + \frac{y_2}{R_2+y_2}\right) \qquad \text{Eqn. 5}$$

wherein the variables are defined as described previously.

Figure 8:
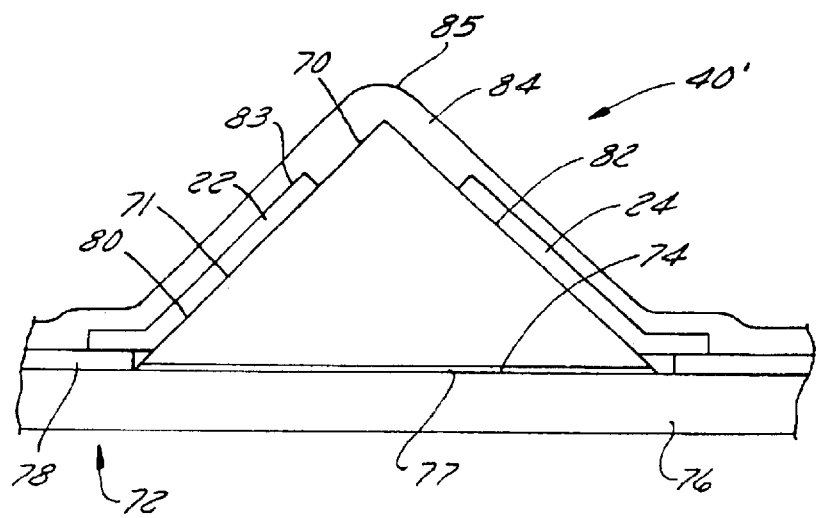
FIG. 8 is a partially broken away cross-sectional view of the components of the sensor assembly of a preferred embodiment of the invention.

In FIG. 8, the components of a sensor assembly 40' are shown arranged according to a preferred embodiment. Sensor assembly 40' includes a flexible pyramid-shaped body or insert 70 that is bonded to a surface 74 of a substrate 76 of a flexible printed circuit 72, preferably with an adhesive 77. Printed circuit 72 is fabricated with electrical conductors disposed in an epoxy or polyimide substrate 76, while strain sensors 22, 24 (which measure shear strain in a first direction, for example, the x direction) are electrically attached to flexible printed circuit 72 via a connection 78. Moreover, sensors 22, 24 are bonded to surfaces 80, 82, respectively, of flexible pyramid-shaped body 70, preferably by an adhesive such as an epoxy 71. Similar connections are made for a second pair of sensors (not shown) that measure strain forces in a second direction orthogonal to the first direction, for example, the y direction as shown in FIG. 4. Alternatively, substrate 76 could be a silicon integrated circuit (IC) fabricated in conventional fashion. The entire sensor assembly 40' may optionally be potted or coated in a material 84 such as an epoxy or some other material suitable to the user, for example, to scale the strain forces exerted on sensors 22, 24, as discussed in further detail below in conjunction with one preferred application of the present invention.

Figure 9:
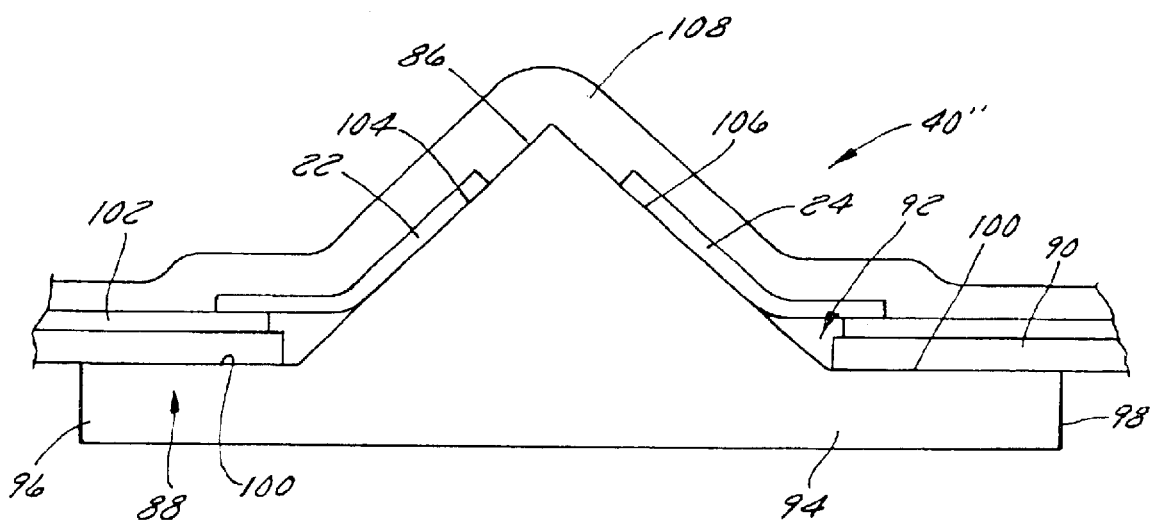
FIG. 9 is a partially broken away cross-sectional view of the components of the sensor assembly according to an alternative embodiment.

In an alternative to sensor assembly 40' of FIG. 8, an arrangement of components of a sensor assembly 40" is shown in FIG. 9. Sensor assembly 40" includes a flexible printed circuit 88 having electrical conductors and circuit components (see FIGS. 6A, 6B and 7) formed in a substrate 90. Substrate 90 has a cutout 92 for a flexible generally pyramid-shaped body 86 to pass through. Body 86 is formed with a flat base 94 having flanges 96, 98 extending outwardly. A top surface 100 of base 94, and particularly flanges 96, 98, is bonded to the bottom surface of the substrate 90 of flexible circuit 88. As in FIG. 8, strain sensors 22, 24 are electrically attached to flexible circuit 88 via a connection 102 and are bonded to surfaces 104, 106 of flexible pyramid-shaped body 86, preferably by epoxy. Again, substrate 90 could be a silicon integrated circuit Further, the entire assembly 40" may optionally be potted or coated in a material 108 such as an epoxy or some other appropriate material.

Figure 10:
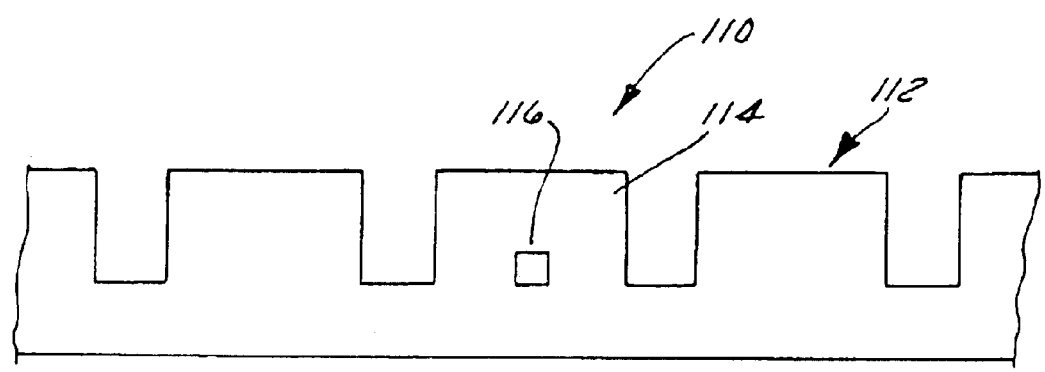
FIG. 10 is a partially broken away cross-sectional view of a tire tread having a sensor assembly embedded therein according to a preferred embodiment.

Referring next to FIG. 10, as suggested previously, a preferred application of the sensor of the present invention is in a tire monitoring environment. FIG. 10 illustrates a cross sectional view of tread rubber portion 112 of a tire 110. A tread block 114 is shown having a device 116 including sensor assembly (for example, 40 in FIG. 5) embedded therein. Notably, device 116 is shown as a square and is oriented to indicate the portion of tread block 114 that is represented in the strain diagrams of FIGS. 2 and 3. Preferably, device 116 is located in a tread block at or near the center portion of the cross-section of the tire so as to ensure the device measures forces acting in the contact region of the tire.

According to a preferred embodiment, sensor assembly 40, having embedded resistive sensors oriented within elastomeric material 21 (such as tread rubber, 112 in FIG. 10) as shown in FIG. 5, provides readily adaptable three-axis strain measurements for the tire monitoring application. During tire operation, strain forces, compressive and shear, acting on the tire are communicated to the sensor assembly 40 such that the forces acting on the tire can be monitored. With pyramid-shaped body 42, accurate orientation of the sensors and maintenance of that orientation throughout the processing of the tire is achieved. Notably, the pyramid-shaped body 42 can be modified to scale the strain exerted on the sensors so that they experience forces primarily in their normal operating range, either by adjusting the elastic modulus of the pyramid material itself, or by adjusting the aspect ratio of the pyramid, the aspect ratio being defined by the ratio-of the height "h" and width "w" of body 42, as illustrated in FIG. 5.

In embedding sensor assembly (for example, 40, 40', or 40" in the above FIGS.) in a tire, or other elastomeric material 21 for that matter, the assembly is preferably introduced to the elastomeric material (in this case, tread rubber) in its uncured state. The tire would then be assembled from its components. A combination of tread rubber and an underlying fiber layer are typically slid into place over a tire carcass (not shown). The assembly is then placed in a curing press. The press applies about 400 psi at about 180° C. This forms the tread pattern with a mold and vulcanizes the rubber. According to this process, the sensor assembly must withstand the temperature and pressure conditions without allowing the strain sensors to change their orientation. By utilizing pyramid-shaped body 42 and selecting appropriate materials to compose the sensor assembly (as shown in FIGS. 8 and 9, for example) these requirements are achieved.

Notably, the operating range of the sensor must be considered in the manufacturing process. The tread rubber in the position to be measured will experience a maximum shear strain of about 10%, or 100,000 micro strains. Taking a typical foil type resistive strain gauge for example, fatigue and failure will occur if the gauge is repeatedly overstrained. At 1500 micro strain, the gauge will fail after about a million cycles, which would occur in about a thousand miles in a tire. At 1200 micro strain, the gauge will last approximately 100,000 miles. Generally, the amount of strain experienced by a device embedded within another material is related to the ratio of the elastic modulus of the materials. Tread rubber has a modulus of elasticity of about 3–7 Mega Pascals. The foil gauge is preferably encapsulated in polyimide or epoxy (as shown, for example, in FIG. 8 at 83) which has a modulus of elasticity of about 3–7 Giga Pascals, thus providing a scale factor of about 1000.

Overall, the amount of strain incurred by the sensor assembly including metal resistor strain gauges can be scaled by one or more of the three following components: the dimensions or composition of the pyramid-shaped body (for example, 42 in FIG. 5), the strain gauge encapsulation, or the adhesive or potting material. Alternatively, or in combination with one or more of these components, a topping or coating layer (e.g., 85 in FIG. 8) may be added to further scale the strain exerted on the sensor. The topping, for example, may be brass. In the case where the strain sensor is not a metal resistor, these components, including the topping layer, may still be used to scale the strain at the sensor, however, other types of sensors, such as some of those described above, may not incorporate encapsulation.

With respect to the characteristics of the pyramid-shaped body (for example, 42 in FIG. 5), the body may be constructed of natural or synthetic rubber. Since the pyramid must maintain the orientation of the sensors during tire curing (i.e., vulcanization), the body is preferably made of pre-cured rubber, or a synthetic rubber which is stable above curing temperatures. Preferably, the hardness of the body is equal or greater than that of the tread rubber where the device will be embedded. Tread rubber is usually between 50 and 70 on a Shore A hardness scale. For greater stiffness, or hardness, material such as polyimide, urethane or epoxy may be used for the body. Metals or crystalline materials may also be used for the pyramid-shaped body. However, if the body is too hard with respect to the rubber of the tire, the strain forces may become undetectable. It is also possible, typically at the interface of the body and the tread rubber, that the strain vectors rotate out of the pyramid surfaces due to the coupling imperfections at the boundary. In this case, one remedy is to modify the aspect ratio of the body to optimize the sensitivity of the x and y axes with respect to the z axis measurement.

Moreover, encapsulation, adhesive, and potting may comprise three different materials, or may be reduced to one or two unique materials, thereby combining their form and functions. First, metal foil type strain gauges 22, 24, 30, 32 are often provided with epoxy or polyimide encapsulation. Next, the sensor must be adhered to the pyramid-shaped body by some means. Adhesion between the components of the device is vital for its survival. The components may be of different materials with different elastic properties. The adhesive must bond these components and withstand billions of strain cycles without failure. Some materials which meet these requirements include epoxy, polyimide and polyurethane. Epoxy is the preferred adhesive because of its ability to adhere well and remain temperature resistant. The adhesive is preferably applied as a thin layer between components, such as between the body and the sensors. Otherwise, in addition to the thin layer of adhesive between components, an excess may be applied, such that the assembly is potted, partially or entirely, with the adhesive to insure a uniform and controllable outer surface (84 in FIG. 8, for example). Alternatively, two different materials may be used for adhesion between components and for potting, respectively. Notably, however, the outermost surface (e.g., the potting) of the three-axis device should be of a material that is compatible with the embedding and curing process.

In general, encapsulation serves two main functions. First, the encapsulation material should be readily adaptable to facilitating a secure connection with the pyramid-shaped body. The encapsulation may also serve as a means to scale the strain at the sensor, based on selected differences in moduluses of elasticity.

Next, with particular reference to the tire monitoring application, the available power is very limited. High resistance strain gauges can be employed to reduce power consumption. They may, however, have a shorter fatigue life due to thinner conductors. Lower voltage excitation can also be used to trade off signal-to-noise for lower power. AC excitation of the resistor gauges can also reduce power consumption, but add to circuit complexity. Alternatively, a piezoelectric sensor can advantageously be used since it draws no current.

The flex circuit (for example, 72 in FIG. 8) which acts as the substrate for the electrical wiring of the device is preferably constructed of polyimide or epoxy as in the case of most readily available flex circuit products. Bonding between the substrate and the pyramid should be appropriate for the materials being bonded to maintain the integrity of the bond. The substrate may also incorporate a set of four strain sensing devices to complete the bridge circuit with the four sensors on the pyramid-shaped body. Again, in an alternative, the substrate is a silicon integrated circuit, incorporating the electronics to difference and amplify the strain signals, as described previously.

PZT (lead zirconium titanate) sensors, schematic shown in FIG. 1C, can be used in place of resistive strain gauges in order to save power. PZT is brittle yet highly sensitive. To bring the strain into the range of these devices, the pyramid-shaped body is made of a relatively hard epoxy, and the sensors is preferably encapsulated in the same epoxy. In one arrangement, the device could be assembled from four individual piezo crystals. Otherwise, PZT could be deposited on the body itself, or on a substrate to be formed into a pyramid-shaped body.

Figure 11:
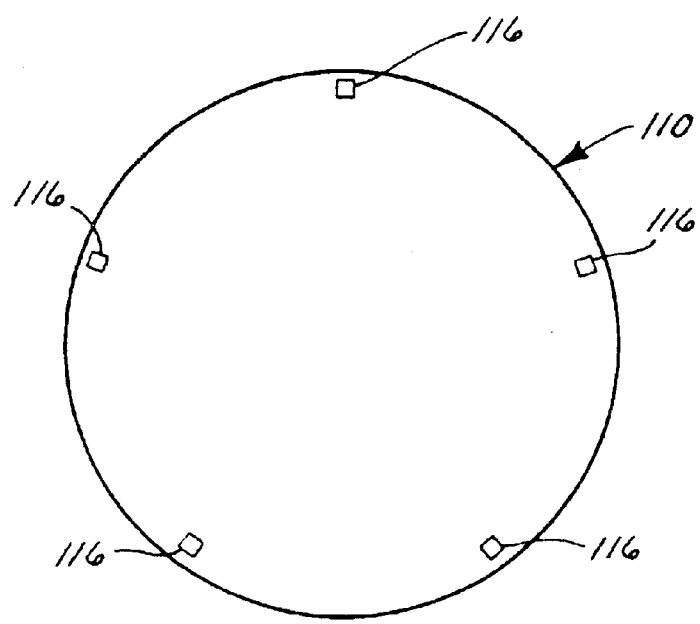
FIG. 11 is a schematic side elevational view of a tire including a plurality of sensor assemblies of the preferred embodiment disposed around the perimeter of the tire.

In FIG. 11, multiple devices 116 (FIG. 10) including sensor assemblies (for example, 40 in FIG. 5) are distributed around the circumference of tire 110. Any number of sensor assemblies may be employed. Preferably, the sensors are separated sufficiently along the circumference such that only one sensor is allowed to pass through the tire's contact region at any particular time. Notably, an increase in the number of sensor assemblies will decrease the sensitivity of any one sensor assemblies if they are summed or averaged together as in the case with any of the sensor busses described hereinafter. The preferred number of sensors is between 3 and 10.

Figure 12:
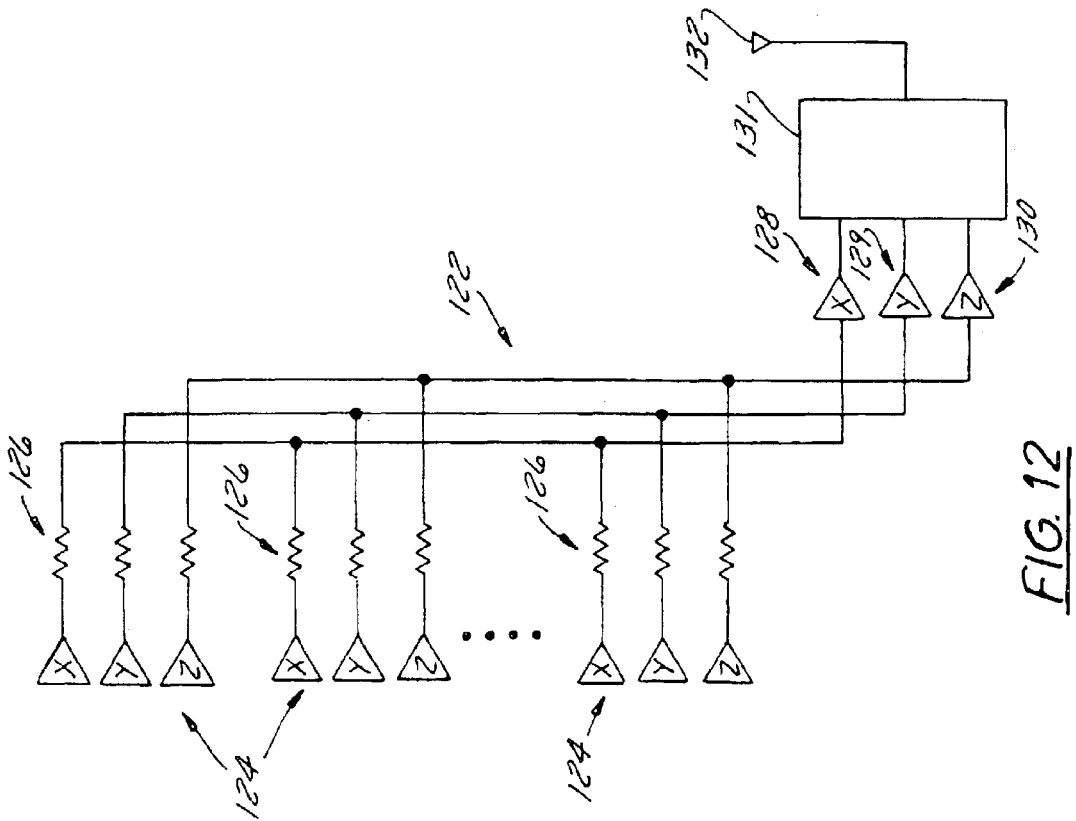
FIG. 12 is a schematic circuit diagram illustrating the outputs of a plurality of sensor assemblies coupled to a sensor bus.

In many applications, including the tire monitoring application described above, it is desirable to have multiple sensor assemblies positioned at different locations in the environment. Referring to FIG. 12, in order to avoid independent processing of a multitude of three axis sensor outputs, a sensing system 120 including a sensor bus 122 is employed to couple the outputs of a plurality of sensor assemblies so that the outputs can be summed or averaged via sensor bus 122 which connects each of sensor assemblies together. System 120 is appropriate for each of the different types of strain sensors discussed previously, provided the outputs of sensor assemblies are buffered by an amplifier 124 (or transistor) in conventional fashion. Preferably, each buffer circuit 124 includes a resistor 126 that couples the corresponding strain sensor output to sensor bus 122, and in particular, one conductor of bus 122 for each strain axis being monitored.

Next, bus 122 terminates at an independent summing or averaging amplifier 128 associated with each strain axis. As a result, the sensor outputs of the plurality of three axis sensor assemblies are reduced to three signals. The data output from amplifiers 128, 129, 130 is communicated to a data transmitter 131 for transmission to, for example, a remote location for further processing.

Notably, as mentioned above, in the case of multiple sensor assemblies in the tire monitoring application, the assemblies are preferably disposed at equal intervals around the circumference of the tire. Moreover, the intervals are preferably large enough such that no more than one sensor assembly passes through the contact region of the tire at any particular time. As a result, sensing system 120 can readily obtain three axis measurements at a particular location of the tire. Furthermore, by reducing the number of signals with this arrangement, system 120 provides significant advantages, especially when the signals communicated to data transmitter 131 is a wireless data link including antenna 132. Notably, the limited bandwidth of data transmitter 131 and the power requirements for increasing the bandwidth or adding channels, render it prohibitive to transmit output signals from each axis of each sensor assembly independently.

Figure 13:
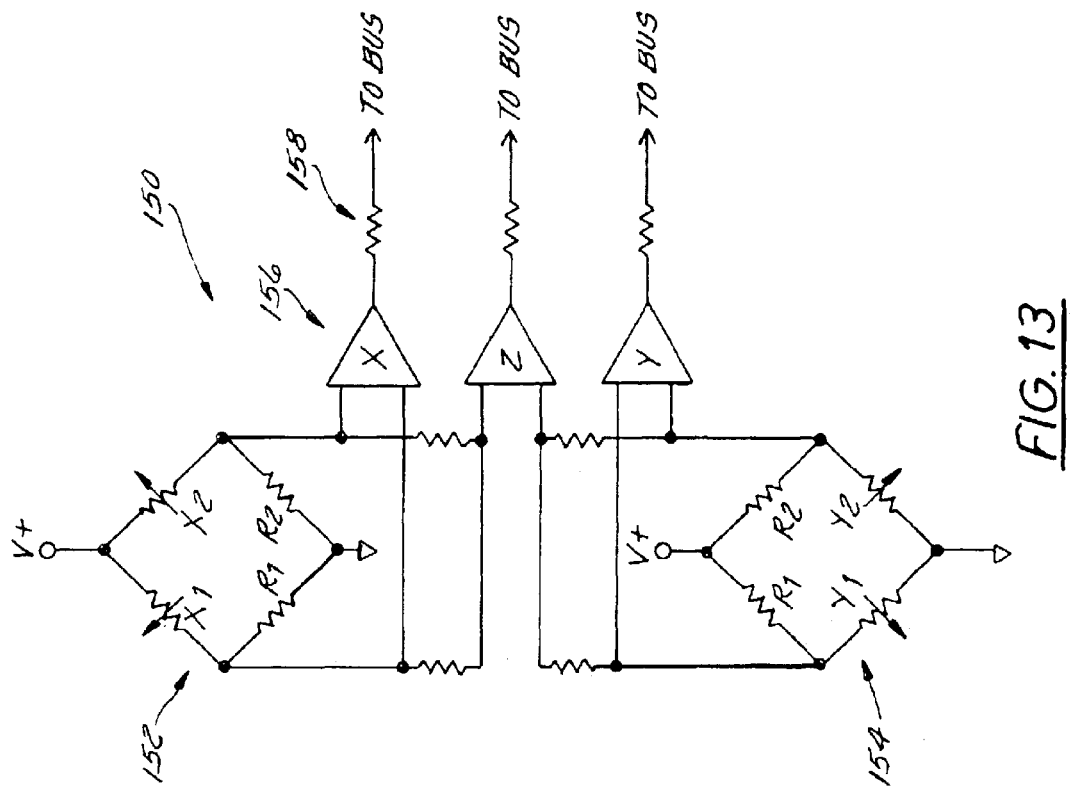
FIG. 13 is a schematic circuit diagram, similar to FIG. 7, showing a more generalized configuration of circuit components.

Referring next to FIG. 13, a more generalized schematic 150 of the circuit shown in FIG. 7 is illustrated, including an x-axis measuring stage 152, and a y-axis measuring stage 154. Unlike the circuit in FIG. 7, the amplifiers 156 are shown as general circuit blocks without indication of the gain elements, i.e. resistors. Resistors 158 are shown at the outputs of the amplifiers associated with the three axes being measured for the purpose of summing the corresponding outputs of the sensor assemblies via sensor bus 122 of FIG. 12. Circuit 150 is preferably used for the resistive strain sensors (described previously) when sensor bus 122 of FIG. 12 is employed. Sensor bus 122 of FIG. 12, employing circuit 150, requires three signal wires associated with each axis of measured strain force, plus the power and ground wires, for a total of five wires to be routed to the location of each sensor assembly, for example, 40 in FIG. 5.

Figure 14:
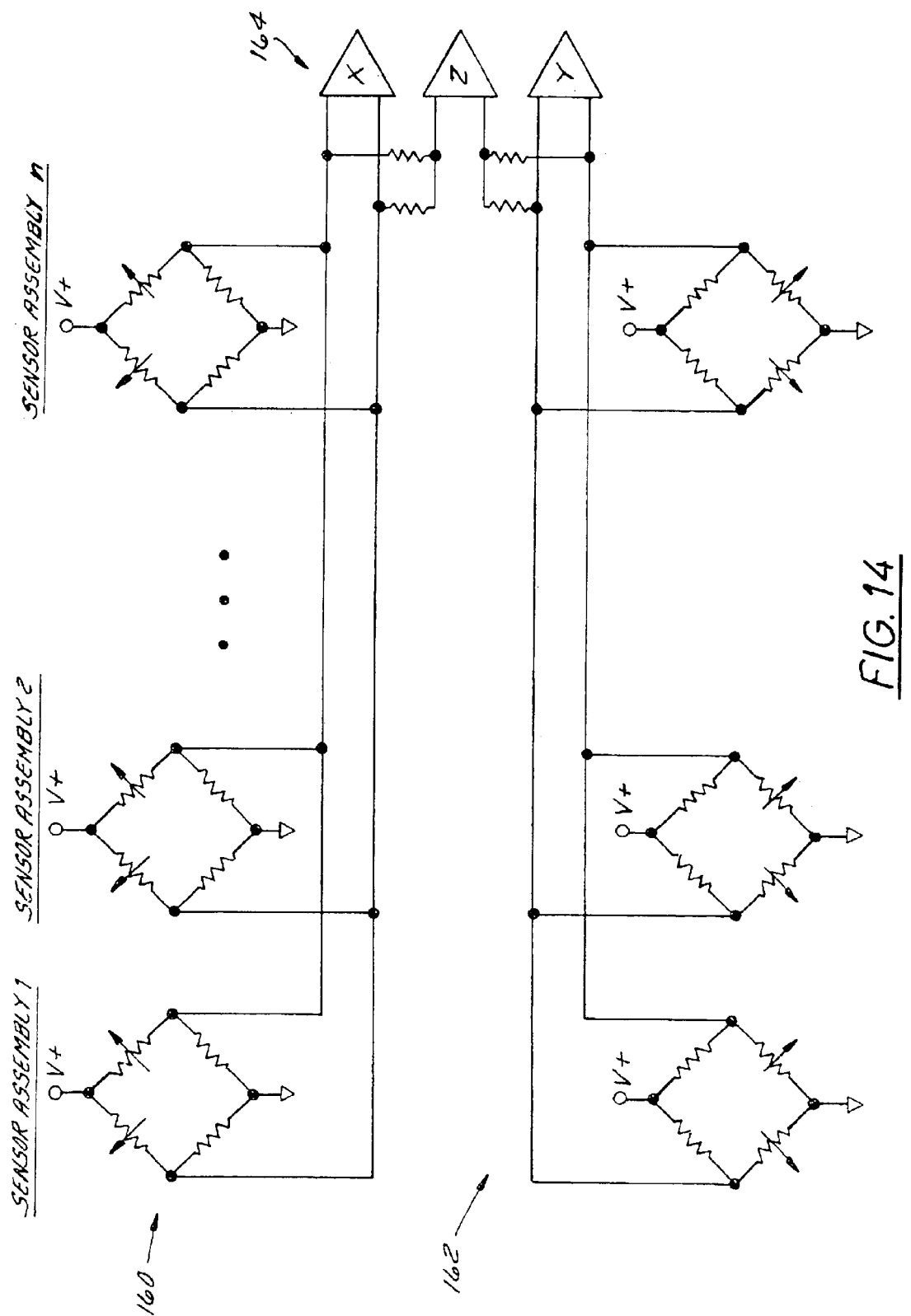
FIG. 14 is a schematic circuit diagram illustrating an alternate sensor bus to the bus shown in FIG. 12, wherein the strain sensors of the sensor assemblies are connected in parallel.

FIG. 14 illustrates an alternative to bus 122 shown in FIG. 12 wherein a circuit 160 has a passive sensor bus 162. A Wheatstone bridge circuit associated with each sensor assembly (for example, 40 in FIG. 5), 1 to n, is connected to a differential pair of sensors associated with the x-axis strain measurement (for example, sensors 22, 24 in FIG. 5), and with the y-axis strain measurement (for example, sensors 30, 32 in FIG. 5), respectively. The bridge circuit of each device can be considered to be in parallel with the other bridge circuits on sensor bus 162 each sending output signals to a common set of buffer amplifiers 164 associated with, for example, three axes of strain measurements. The output of amplifiers 164 is then communicated to, for example, data transmitter 131 of FIG. 12. Circuit 120 typically has better noise immunity than circuit 160 due to the proximity of buffer amplifiers 126 to the strain sensing elements. However, circuit 162 includes fewer active components and consumes less power due to the elimination of the plurality of buffer amplifiers at the location of each sensor assembly. Sensor bus 162, also in contrast to bus 122 requires four (4) signal wires in addition to the power and ground wires, for a total of six (6) wires to be routed to each sensor assembly location.

Figure 15:
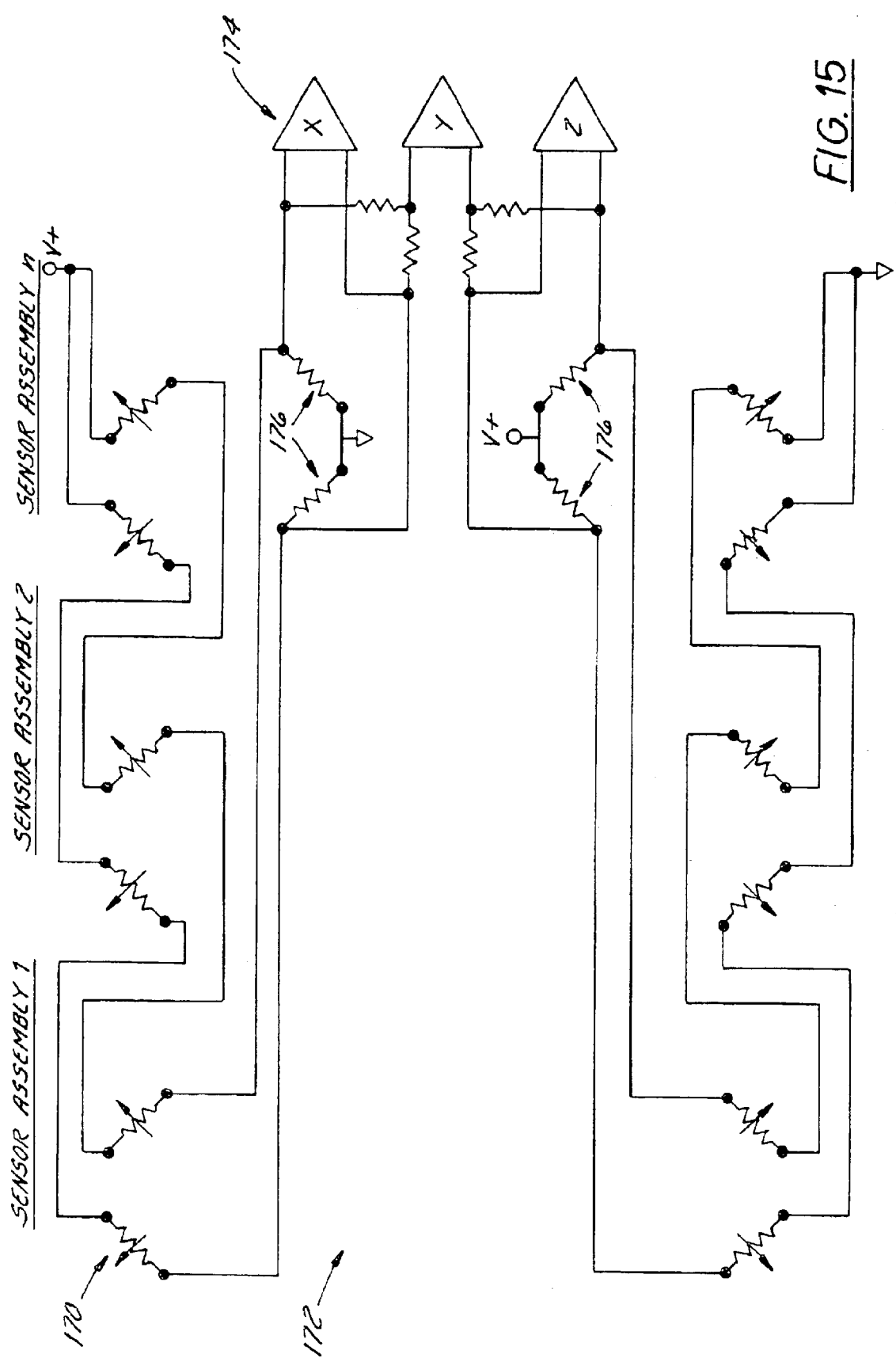
FIG. 15 is a schematic circuit diagram illustrating another alternative sensor bus to the bus shown in FIG. 12, wherein the strain sensors of the sensor assemblies are connected in series.

Contrary to the parallel arrangement of circuit 160 in FIG. 14, FIG. 15 illustrates a circuit 170 having a sensor bus 172 which connects the strain sensors of the multiple sensor assemblies in series. The advantage associated with circuit 170 is a high net resistance between power and ground. As a result, circuit 170 has a low power consumption. In FIG. 15, the reference resistors 178 (see FIGS. 6A and 6B and the associated description) are combined for all sensor assemblies on sensor bus 172 into four resistors at buffer amplifiers 174, such that the value is the sum of the reference resistors combined. Notably, resistors 176 may be distributed among the different locations of the sensor assemblies.

Figure 16:
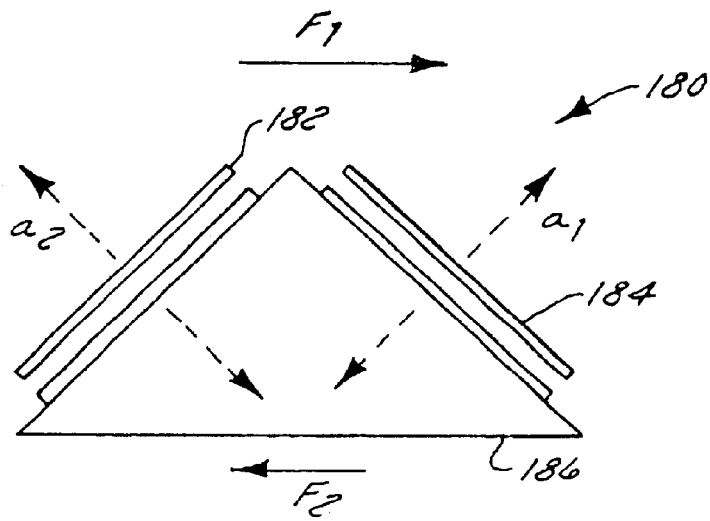
FIG. 16 is a schematic illustration of a parallel plate capacitor sensor used as the strain sensors of the sensor assemblies of FIGS. 4 and 5.

Referring next to FIG. 16, a sensor assembly 180 having a pair of parallel plate capacitive sensors 182, 184 disposed on opposed faces of a pyramid-shaped body 186 is shown. Sensors 182, 184 measure strain forces along the axes of elongation and contraction $a_1$, $a_2$ as before, wherein axes $a_1$ and $a_2$ are illustrated in reverse to indicate their effect normal to the plane of the plates of capacitive sensors 182, 184. Preferably, the pyramid-shaped body 186 is made of the same flexible material in which sensor assembly 180 is embedded, or at least in a material of comparable flexibility. Also, the dielectric (not shown) between the capacitor plates of sensors 182, 184 is a flexible material similar to the material of pyramid-shaped body 186 as well as the surrounding elastomeric material. For an applied shear strain, illustrated by forces $F_1$ and $F_2$, the $a_1$ axis will elongate while the $a_2$ axis will contract. The effect of this corresponding distortion will be an increase in plate separation of capacitive sensor 184, and a corresponding decrease in plate separation of capacitance sensor 182. Similar to the previous embodiments, the differential change in capacitance between sensors 182 and 184 is detected by an appropriate circuit conventional in the art to generate a signal indicative of the strain force.

Figure 17A:
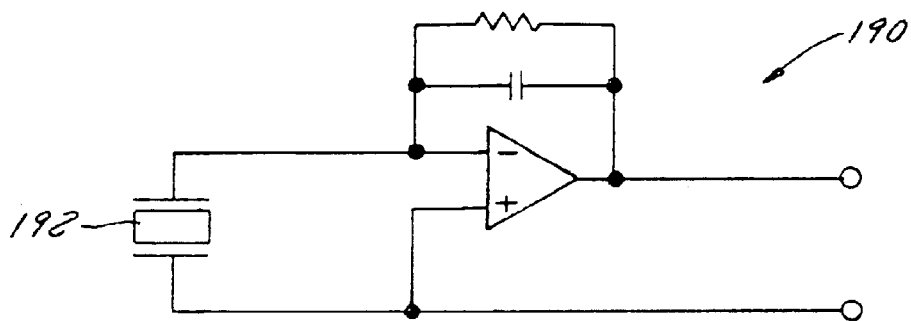
FIGS. 17A–17D are schematic circuit diagrams associated with using an alternative strain sensor.
Figure 17B:
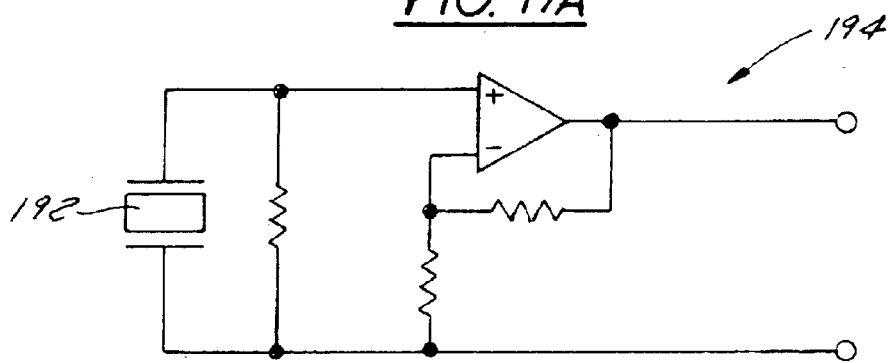
Figure 17C:
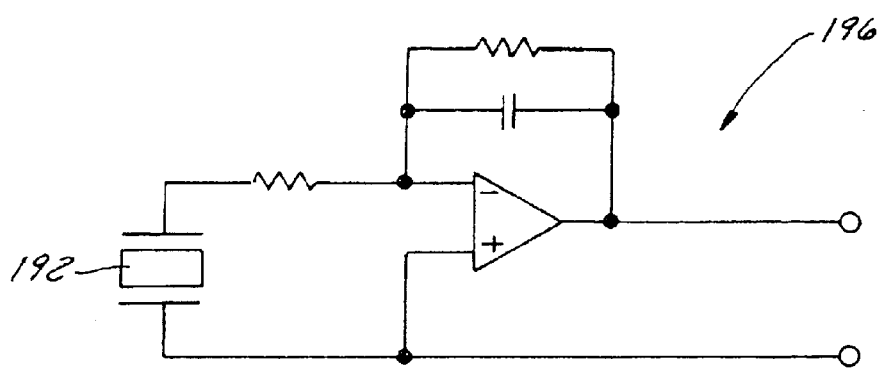
Figure 17D:
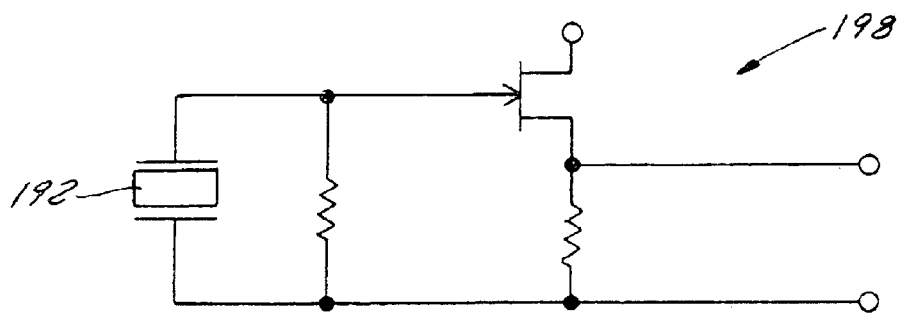

Referring next to FIGS. 17A–17D, circuits for determining strain forces detected by a piezoelectric strain sensor 192 are illustrated. In each case, it is preferable to locate a buffer amplifier circuit in close proximity to the sensor 192. In FIG. 17A, a buffer amplifier circuit 190 includes a charge amplifier where $V_{out}$ equals Q/C. In FIG. 17B, a circuit 194 coupled to a piezoelectric sensor 192 includes a non-inverting voltage gain amplifier conventional in the art. In FIG. 17C, a buffer circuit 196 coupled to sensor 192 includes an inverting voltage gain amplifier which may also act as a charge amplifier, as is conventional in the art. In FIG. 17D, buffer circuit 198 comprises a field effect transistor (FET) circuit interface for buffering the outputs of the sensor assemblies.

Figure 18:
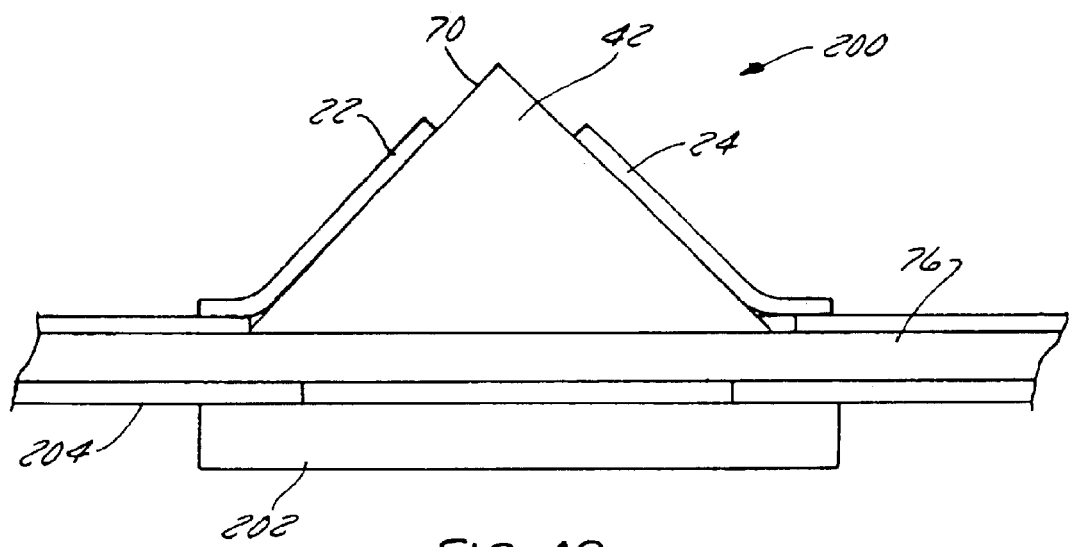
FIGS. 18 and 19 are partially broken away cross-sectional views similar to FIGS. 8 and 9, illustrating the components of alternative embodiments of the sensor assembly of the present invention.
Figure 19:
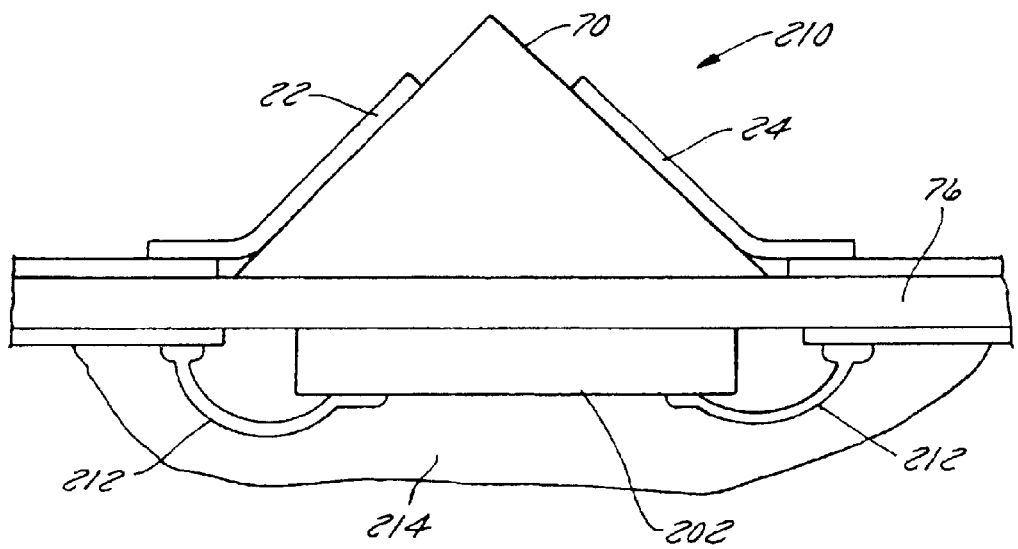

Turning to FIG. 18, in each of the above cases where a buffer amplifier is located in close proximity to the sensor assembly, the buffer amplifier is preferably mounted under the pyramid-shaped body of the sensor assembly on the opposite side of the flexible substrate. In FIG. 18, one embodiment of this configuration the amplifier is part of an IC 202 that is electrically bonded directly to conductors on a substrate via a connection 204. Inputs and outputs to the IC may be connected in this way to the multiple conductors patterned on the substrate. Alternatively, in FIG. 19, the configuration 210 utilizes wire bonds 212 to make the electrical connection from the substrate to the IC 202. In FIG. 19, it is necessary to "pot" the wire bonds in an epoxy 214 or other equivalent material, as described previously.

Figure 20:
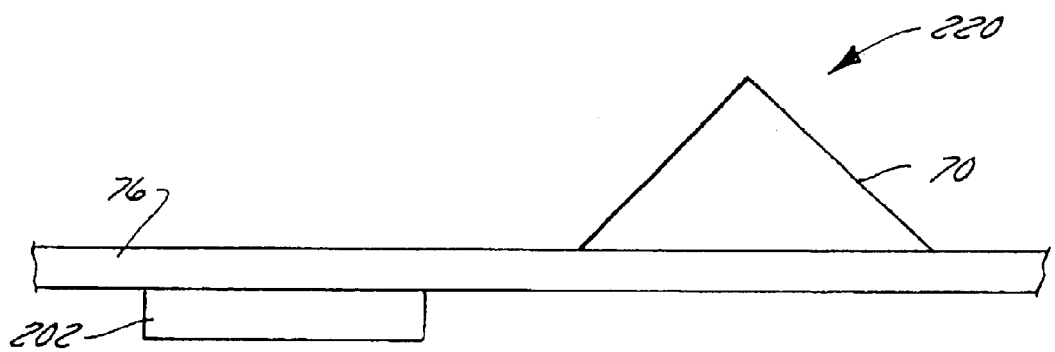
FIGS. 20 and 21 are partially broken away cross-sectional views of alternative embodiments of the sensor assemblies of FIGS. 18 and 19.
Figure 21:
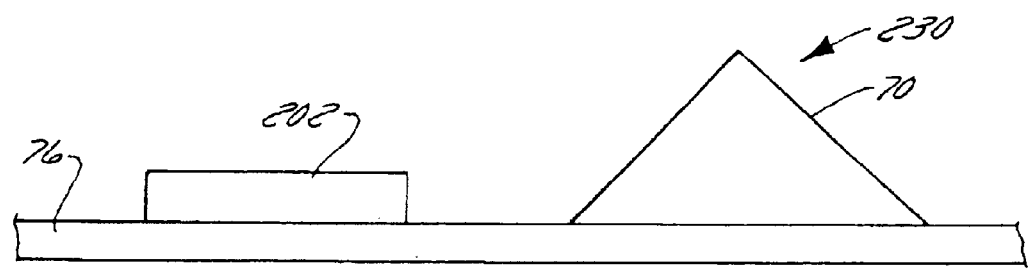

Referring to FIG. 20, in an alternative to the mounting of the silicon IC underneath the pyramid-shaped body of the sensor assembly shown in FIGS. 18 and 19, a silicon IC 202 is mounted adjacent to the body of sensor assembly 220. FIG. 20 shows IC 202 mounted on the opposite side of the substrate 76 relative to the mounting of the pyramid-shaped body 70, while FIG. 21 illustrates an IC 202 being mounted on the same side of substrate 76 as the pyramid-shaped body 70. In either case, the IC 202 in FIGS. 20 and 21 may be connected through direct electrical bonding as in FIG. 18, or by wire bonding as in FIG. 19.

The scope of the invention is not to be limited by the descriptions provided above, but rather is to be limited solely by the scope of the claims which follow.

What is claimed is:

1. A sensor assembly embedded in an elastomeric material, said sensor assembly comprising:
   a pair of first strain sensors disposed on first opposed faces of a flexible pyramid-shaped body, said first strain sensors being deformable under a force applied by contact thereto for detecting a force in a first direction; and
   a portion of elastomeric material in which said pair of first strain sensors and the flexible pyramid-shaped body on which said pair of first strain sensors is disposed are embedded;
   wherein said first strain sensors generate corresponding output signals in response to the force in the first direction and wherein the force in the first direction is generally equal to the difference between the output signals of said first strain sensors.

2. The sensor assembly of claim 1, further comprising:
   a pair of second strain sensors disposed on second opposed faces of said body, said second opposed faces adjacent to said first opposed faces, and said second strain sensors detecting a force in a second direction generally orthogonal to said first direction;
   and wherein said second strain sensors generate corresponding output signals in response to the force in the second direction, and wherein the force in the second direction is generally equal to the difference between the output signals of said second strain sensors.

3. The sensor assembly of claim 2, wherein a sum of the first output signals and the second output signals is indicative of a force in a third direction is orthogonal to the first and second directions.

4. The sensor assembly of claim 1, wherein said body is made of the same material as the elastomeric material.

5. The sensor assembly of claim 1, wherein said body has a body hardness greater than the hardness of the elastomeric material.

6. The sensor assembly of claim 5, wherein the hardness of the elastomeric material is generally between 50 and 70 on the Shore A hardness scale.

7. The sensor assembly of claim 6, wherein said body is made of one of polyamide, urethane and epoxy.

8. The sensor assembly of claim 1, wherein said first strain sensors are parallel plate capacitors.

9. The sensor assembly of claim 1, wherein said first strain sensors are piezoresistive silicon strain gauges.

10. The sensor assembly of claim 1, wherein said first strain sensors are piezoelectric devices.

11. The sensor assembly of claim 10, wherein at least one of said piezoelectric devices is one of PZT, ZnO, and PVDF.

12. The sensor assembly of claim 1, wherein said first strain sensors are interdigitated finger capacitors.

13. The sensor assembly of claim 3, further including a plurality of sensor assemblies embedded in an object in a mutually spaced relationship.

14. The sensor assembly of claim 1, wherein said portion of elastomeric material comprises a tire.

15. A process of embedding a sensor in an elastomeric material, the process comprising:
   providing a three-axis sensor assembly including two pairs of strain gauges, a first pair disposed on first opposed faces of a pyramid-shaped body so as to detect strain applied directly to said first pair of sensors in a first direction, and a second pair disposed on second opposed faces of the pyramid-shaped body so as to detect strain applied directly to said second pair of sensors in a second direction; and
   adjusting the aspect ratio of the pyramid-shaped body to a sensitivity of the three-axis sensor.

16. The process of claim 15, further including the step of adjusting the hardness of the pyramid-shaped body relative to the elastomeric material.

17. The process of claim 15, wherein the sensor is introduced to the elastomeric material when the elastomeric material is in an uncured state.

18. The process of claim 15, further including the step of encapsulating the first and second pairs of strain gauges in a second material different than the elastomeric material.

19. The process of claim 18, further including the step of selecting a ratio of elastic moduluses between the elastomeric material and the second material.

20. The process of claim 19, wherein the second material is one of polyimide and epoxy.

21. The process of claim 20, further including the step of coupling the strain gauges to the body with an adhesive.

22. The process of claim 21, further including the step of potting the sensor assembly in a third material.

23. The process of claim 22, wherein the adhesive and the third material are the same.

24. The process of claim 15, further including the step of placing a topping layer on the sensor assembly so as to scale strain forces sensed by the strain gauges.

25. A process of embedding a sensor in an elastomeric material, the process comprising:
> providing a three-axis sensor assembly including first and second pairs of strain sensors, the first pair disposed on first opposed faces of a pyramid-shaped body so as to detect strain in a first direction applied directly to the first pair of sensors, and the second pair disposed on second opposed faces of the pyramid-shaped body so as to detect strain in a second direction applied directly to the second pair of sensors; and
>
> placing the sensor assembly in the elastomeric material when the elastomeric material is in an uncured state.

26. The process of claim 25, further comprising the step of adjusting the aspect ratio of the pyramid-shaped body according to a sensitivity of the sensor assembly..

27. The process of claim 25, further comprising the step of encapsulating the first and second pairs of strain sensors.

28. The process of claim 27, wherein said encapsulating step includes using a second material different than the elastomeric material.

29. The process of claim 28, further comprising the step of selecting a ratio of elastic moduluses between the elastomeric material and the second material.

30. The process of claim 29, wherein the second material is one of polyimide and epoxy.

31. The process of claim 28, further including the step of coupling the strain sensors to the pyramid-shaped body with an adhesive.

32. The process of claim 31, further including the step of potting the sensor assembly in a third material.

33. The process of claim 32, wherein the elastomeric material, the second material, the third material and the adhesive are different.

34. The process of claim 32, further including the step of placing a topping layer on the sensor assembly so as to scale strain forces sensed by the strain sensors.

35. The process of claim 25, further comprising the step of adjusting the hardness of the pyramid-shaped body relative to the elastomeric material.

36. The process of claim 25, further comprising the step of coupling the pyramid-shaped body to a printed circuit.

37. The process of claim 36, wherein the printed circuit board is flexible.

38. The process of claim 36, wherein the printed circuit includes a substrate and said coupling step includes coupling the pyramid-shaped body to the substrate.

39. The process of claim 38, wherein the substrate comprises a silicon IC.

40. The process of claim 39, wherein the substrate further comprises one of a polyimide and an epoxy.

41. The process of claim 40, further comprising the step of electrically coupling the strain sensors to the printed circuit board.

42. The process of claim 38, wherein the substrate includes generally planar top and bottom surfaces, and the pyramid-shaped body is coupled to the top surface.

43. The process of claim 42, further comprising the step of disposing an integrated circuit on the bottom surface when the strain sensors are piezoelectric strain sensors.

44. The process of claim 43, further comprising the step of electrically coupling the integrated circuit to the printed circuit.

45. The process of claim 43, wherein the integrated circuit is displaced from the pyramid-shaped body.

46. The process of claim 43, wherein the integrated circuit includes a buffer amplifier.

47. The process of claim 25, further comprising the step of coupling the resistive strain sensors to the opposed faces with an adhesive.

48. The process of claim 47, wherein the adhesive is an epoxy.

49. A three-axis sensor assembly comprising:
> a three-axis sensor assembly embedded in a material, said three-axis sensor assembly including two pairs of strain sensors, a first pair disposed on first opposed faces of a pyramid-shaped body so as to deform in response to strain in the material transmitted directly to said first pair in a first direction, and a second pair disposed on second opposed faces of the pyramid-shaped body so as to deform in response to strain in the material transmitted directly to said second pair in a second direction;
>
> a printed circuit responsive to the outputs of said strain sensors to generate a corresponding signal indicative of the corresponding strain acting on the material; and
>
> wherein the sensor assembly is electrically coupled to the printed circuit.

50. The three-axis sensor assembly of claim 49, wherein the strain sensors are resistive strain sensors.

* * * * *